(12) United States Patent
Lenahan et al.

(10) Patent No.: US 10,394,892 B2
(45) Date of Patent: *Aug. 27, 2019

(54) DYNAMIC CONTENT DELIVERY SEARCH SYSTEM

(71) Applicant: eBay Inc., San Jose, CA (US)

(72) Inventors: Michael George Lenahan, Moraga, CA (US); Ben Mitchell, Oakland, CA (US); R. J. Pittman, San Francisco, CA (US); Dave Lippman, San Francisco, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,689

(22) Filed: Aug. 18, 2017

(65) Prior Publication Data

US 2017/0344664 A1 Nov. 30, 2017

Related U.S. Application Data

(63) Continuation of application No. 14/588,312, filed on Dec. 31, 2014, now Pat. No. 9,805,141.

(51) Int. Cl.
*G06F 7/00* (2006.01)
*G06F 17/30* (2006.01)
*G06F 16/9032* (2019.01)

(52) U.S. Cl.
CPC ................ *G06F 16/9032* (2019.01)

(58) Field of Classification Search
None
See application file for complete search history.

(56) References Cited

U.S. PATENT DOCUMENTS

| 8,010,523 | B2 | 8/2011 | Djabarov |
| 8,150,827 | B2* | 4/2012 | Kraftsow .......... G06F 17/30687 |
| | | | 707/706 |
| 8,782,072 | B2 | 7/2014 | Bennett |
| 2007/0162422 | A1* | 7/2007 | Djabarov .......... G06F 17/30646 |
| 2011/0093488 | A1 | 4/2011 | Amacker et al. |
| 2012/0246135 | A1* | 9/2012 | Bennett ............. G06F 17/30265 |
| | | | 707/706 |
| 2013/0041885 | A1 | 2/2013 | Bennett |
| 2013/0097181 | A1* | 4/2013 | Sud ................... G06F 17/30864 |
| | | | 707/748 |
| 2014/0089295 | A1* | 3/2014 | Becherer ........... G06F 17/30247 |
| | | | 707/722 |
| 2014/0282136 | A1* | 9/2014 | Marantz .............. G06F 17/3097 |
| | | | 715/764 |

* cited by examiner

*Primary Examiner* — Tuan A Pham

(57) ABSTRACT

Example embodiments of the present disclosure include a system comprising a computer-readable storage medium storing at least one program and a computer-implemented method for providing a dynamic content delivery search system. In example embodiments, entry of a first keyword of a search string comprising a plurality of keywords is detected. The first keyword is identified after entry of the first keyword and prior to entry of a second keyword of the search string. A first set of matching results that match the identified first keyword is determined. Entry of the second keyword is detected and the second keyword identified. Using the second keyword, the first set of matching results is refined. The resulting search results are presented to a user.

14 Claims, 13 Drawing Sheets

DYNAMIC CONTENT DELIVERY SEARCH SYSTEM

PRIORITY

This application is a continuation of and claims the benefit of priority to U.S. patent application Ser. No. 14/588,312, entitled "DYNAMIC CONTENT DELIVERY SEARCH SYSTEM," filed on Dec. 31, 2014, which is hereby incorporated by reference herein in its entirety.

FIELD

The present disclosure relates generally to data analysis and, in a specific example embodiment, to providing dynamic content delivery.

BACKGROUND

Typically, when a user performs a search, the user must enter a search string and then select an "enter" key. Once the "enter" key is selected, a search system takes the entire search string and performs a search for entries that match the entire search string. As such, there is a lag time between the user entering the search string and selecting the "enter" key and obtaining search results.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing dynamic search content to a user in an efficient and expedited manner. Example embodiments allow the user to enter a search string into a search bar comprising one or more keywords. As the user is entering (e.g., typing or speaking) the search string, the dynamic content delivery search system is already taking the keywords and preforming a matching process on-the-fly to determine matching results to the keywords. This is done without the user having to select an "enter" key, for example. As such, as soon as the user is done entering an entire search string, and without the user having to select the "enter" key, search results are queued up to be presented to the user, and may be automatically "surfaced" around the search bar. Accordingly, there is no lag time in presenting the results since the matching process is being performed before the user even finishes entering the complete search string, and the potential results queued up (e.g., in memory or cache) for immediate delivery upon completion of entry of the search string.

As a result, one or more of the methodologies described herein facilitate content delivery to the user in an efficient and expedited manner. When these effects are considered in aggregate, one or more of the methodologies described herein may obviate a need for certain efforts or resources that otherwise would be involved in providing content to a search request. Computing resources used by one or more machines, databases, or devices (e.g., within the network environment 100) may be reduced. Examples of such computing resources include processor cycles, network traffic, memory usage, data storage capacity, power consumption, and cooling capacity.

Figure 1:
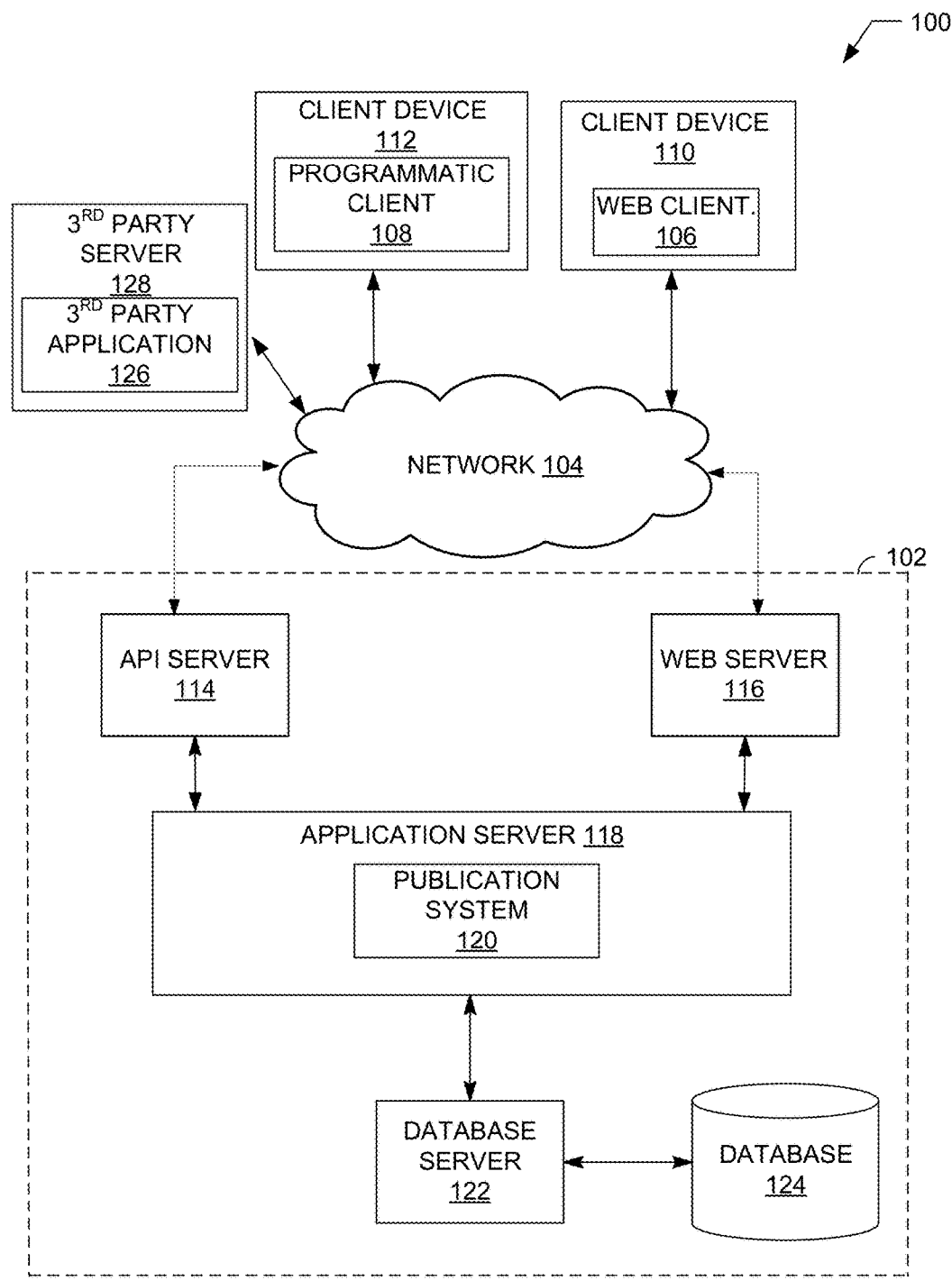
FIG. 1 is a block diagram illustrating an example embodiment of a network architecture of a system used to provide a dynamic content delivery search system.

With reference to FIG. 1, an example embodiment of a high-level client-server-based network architecture 100 to provide a dynamic content delivery search system is shown. A networked system 102, in an example form of a network-server-side functionality, is coupled via a communication network 104 (e.g., the Internet, wireless network, cellular network, or a Wide Area Network (WAN)) to one or more client devices 110, 112. FIG. 1 illustrates, for example, a web client 106 operating via a browser (e.g., such as the Internet Explorer® browser developed by Microsoft® Corporation of Redmond, Wash. State), and a programmatic client 108 executing on respective client devices 110, 112.

The client devices 110, 112 may each comprise a mobile phone, desktop computer, laptop, or any other communication device that a user may utilize to access the networked system 102. In some embodiments, each client device (e.g., client device 110) may comprise a display module (not shown) to display information (e.g., in the form of user interfaces). In further embodiments, the client device may comprise one or more of a touch screen, accelerometer, camera, microphone, and Global Positioning System (GPS) device. The client devices 110, 112 may be a device of a user, which is used to trigger processing of information, perform searches, and receive results from the dynamic content delivery search system provide by the networked system 102. In one embodiment, the networked system 102 includes or is linked to a network-based marketplace that manages digital goods, publishes publications comprising product listings of products available on the network-based marketplace, and manages payments for these marketplace transactions.

An Application Program Interface (API) server 114 and a web server 116 are coupled to, and provide programmatic and web interfaces respectively to, one or more application servers 118. The application server 118 hosts a publication system 120, which may comprise one or more modules, applications, or engines, and which may be embodied as hardware, software, firmware, or any combination thereof. The application server 118 is, in turn, coupled to one or more database servers 122 facilitating access to one or more information storage repositories or databases 124. In one embodiment, the database 124 is a storage device that stores content (e.g., product listings, store information, advertisements, videos) that may be searched by the dynamic content delivery search system.

In example embodiments, the publication system 120 publishes content on a network (e.g., Internet). As such, the publication system 120 provides a number of publication functions and services to users that access the networked system 102. In example embodiments, the publication system 120 is a marketplace environment whereby a user may purchase products listed thereon. However, it is noted that the publication system 120 may, in alternative embodiments, be associated with a non-marketplace environment such as an informational (e.g., search engine) or social networking environment. The publication system 120 will be discussed in more detail in connection with FIG. 2 below.

While the publication system 120 is shown in FIG. 1 to form part of the networked system 102, it will be appreciated that, in alternative embodiments, the publication system 120 may form part of a separate service that is distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 may also be implemented as a standalone system or standalone software program operating under a separate hardware platform, which does not necessarily have networking capabilities. For example, the publication system 120 along with the database 124 may be entirely on the client device (e.g., client device 112), or the publication system 120 may be on the client device and have access to the separate database 124.

Figure 2:
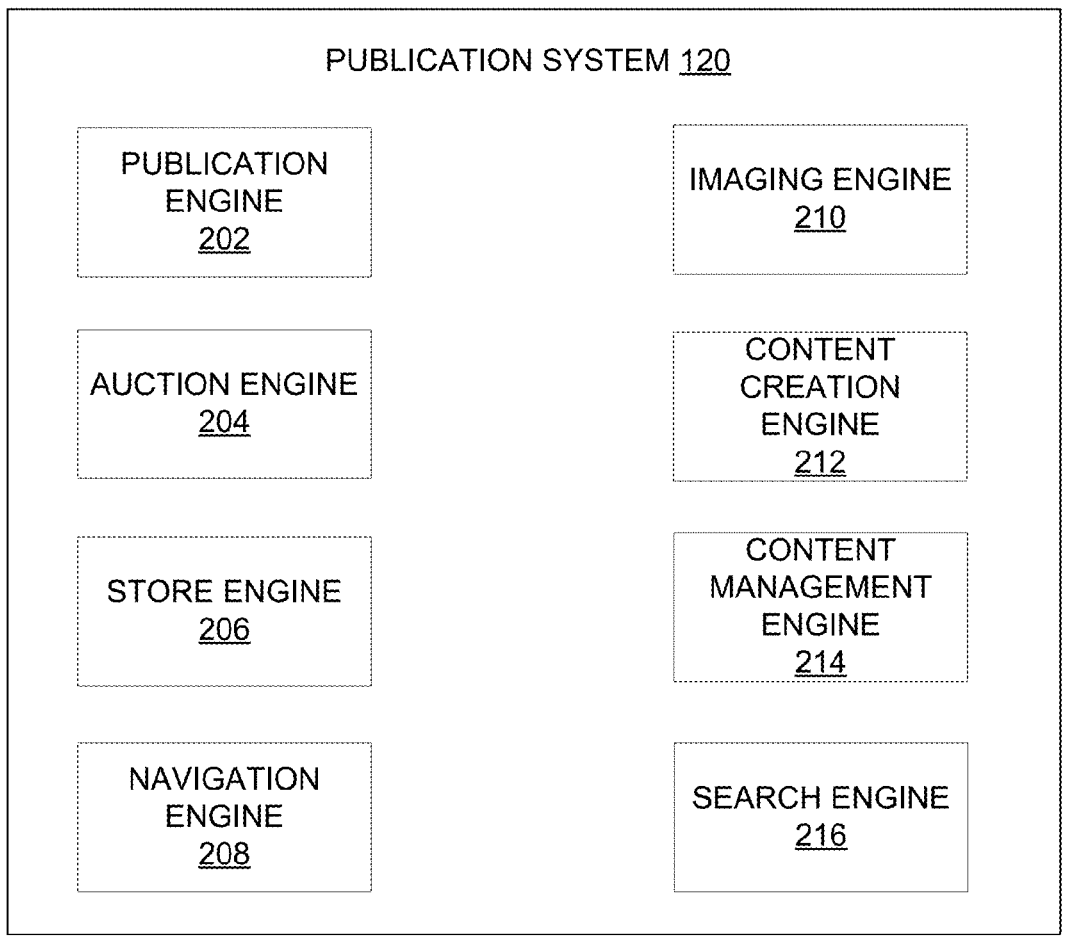
FIG. 2 is a block diagram illustrating an example embodiment of a publication system.

Referring now to FIG. 2, an example block diagram illustrating multiple components that, in one embodiment, are provided within the publication system 120 of the networked system 102 is shown. In this embodiment, the publication system 120 comprises a content delivery search system that is associated with a network-based marketplace where items (e.g., goods or services) may be offered for sale. The items may comprise digital goods (e.g., currency, license rights) as well as physical goods. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 124 via the one or more database servers 122.

The publication system 120 provides a number of publishing, listing, and price-setting mechanisms whereby a seller (e.g., individual, store, company) may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A store engine 206 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for sale or auction, or a combination of both. The seller may also offer other content via their store. For example, the seller may provide recipes or videos (e.g., showing how to make or use an item).

Navigation of the publication system 120 may be facilitated by a navigation engine 208. For example, a browse module (not shown) of the navigation engine 208 allows users to browse various search results, categories, catalogs, or inventory data structures according to which content may be classified within the publication system 120. Various other navigation applications within the navigation engine 208 may be provided to supplement the browsing applications.

In order to make content available via the networked system 102 as visually informing and attractive as possible, the publication system 120 may include an imaging engine 210 that enables users to upload images or videos for inclusion within publications and to incorporate images or videos within viewed publications. The imaging engine 210 may also receive image data from a user as a search query and utilize the image data (e.g., metadata) to identify an item depicted or described by the image data. In accordance with example embodiments, the imaging engine 210 may use images or other digital content obtained from third party media hosting sites.

A content creation engine 212 allows users (e.g., sellers) to conveniently author publications, content, or listings of items. In one embodiment, the content pertains to goods or services that a user (e.g., a seller) wishes to transact via the publication system 120. In other embodiments, a user may create content that is an advertisement or other form of publication (e.g., tutorial video).

A content management engine 214 allows the users to manage such publications or content. Specifically, where a particular user has authored or published a large number of content, the management of such content may present a challenge. The content management engine 214 provides a number of features (e.g., auto-relisting, inventory level monitors, etc.) to assist the user in managing such content.

A search engine 216 performs searches for content in the networked system 102 that match a query, appends keywords to a search string, queues up search results, and manages presentation of the search results. The searches are performed on-the-fly as the user is entering the search string. The results may be queued up for presentation to the user (e.g. cached) as soon as the user has completed the search string and without the user having to select an "enter" button or key. The search engine 216 will be discussed in more detail in connection with FIG. 3 below.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 120 have been included in FIG. 2. In general, components, protocols, structures, and techniques not directly related to functions of exemplary embodiments (e.g., pricing engine, dispute resolution engine, loyalty promotion engine, personalization engines) have not been shown or discussed in detail. The description given herein simply provides a variety of exemplary embodiments to aid the reader in an understanding of the systems and methods used herein.

Figure 3:
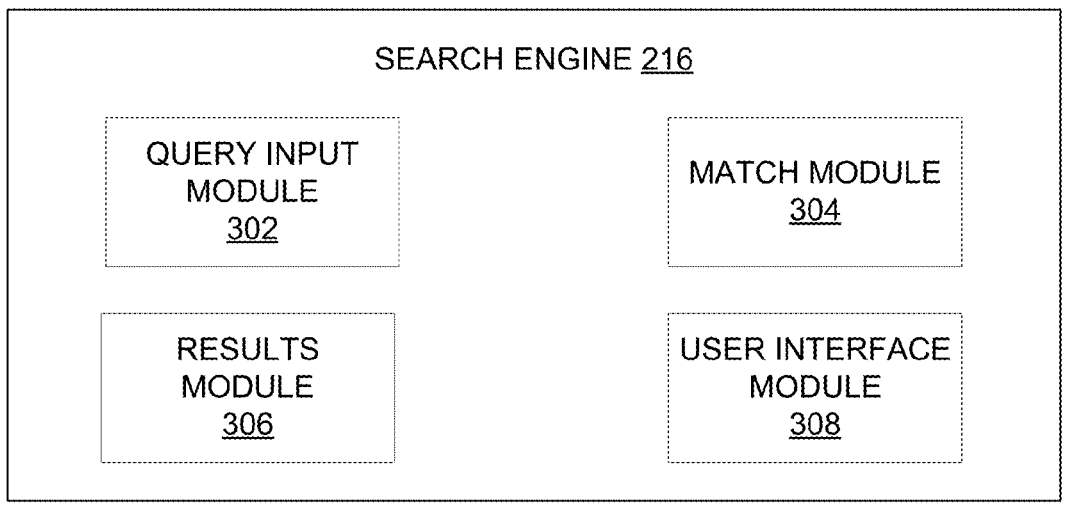
FIG. 3 is a block diagram illustrating an example embodiment of a search engine.

FIG. 3 illustrates an example block diagram having multiple components that, in one embodiment, are provided within the search engine 216 of the publication system 120. The search engine 216 comprises a dynamic content delivery search system that performs dynamic on-the-fly matching of keywords in a search string as the user is entering the search string and queues up the search results for immediate presentation to the user upon completion of the entry of the search string. The search engine 216 also allows a user to append keywords to a search string simply by selecting an image corresponding to a category, sub-category, or item of interest that is displayed. Additionally, the search engine 216 provides an endless search result page (SRP) that appends a previous level of a search result to a bottom or end of a current level of a search result. To enable these operations, the search engine 216 comprises a query input module 302, a match module 304, a results module 306, and a user interface module 308 all communicatively coupled together.

As is understood by skilled artisans in the relevant computer and Internet-related arts, each component (e.g., a module or engine) illustrated in FIG. 2 and FIG. 3 may represent a set of logic (e.g., executable software instructions) and the corresponding hardware (e.g., memory and processor) for executing the set of logic. Further, each of the components (e.g., a module or engine) illustrated in FIG. 2 and FIG. 3 is communicatively coupled (e.g., via appropriate interfaces) to the other components and to various data sources, so as to allow information to be passed between the components or so as to allow the components to share and access common data. Moreover, each component illustrated in FIG. 2 and FIG. 3 may be hosted on dedicated or shared server machines that are communicatively coupled to enable communications between server machines.

The query input module 302 manages operations involving input of a search string within a search box displayed on a user interface presented to a user. Accordingly, the query input module 302 detects when a search string is being entered into the search box and identifies one or more keywords of the search string. For example, as soon as a user enters a first keyword in the search string, the query input module 302 detects the entry of the keyword (e.g., detecting a space after a series of letters or detecting selection of a space bar), identifies the keyword, and passes the keyword to the match module 304. This process continues for each additional keyword of the search string. The query input module 302 also manages operations involving appending keywords to the search string based on a selection from a previously presented search result as will be discussed in more detail below.

The match module 304 performs a matching process to determine matches to one or more keywords of the search string in real-time. In example embodiments, the match module 304 receives a first keyword detected by the query input module 302 and performs a first matching process to derive results that match the first keyword. Subsequently, if the query input module 302 detects a second keyword in the search string, the match module 304 uses that second keyword to refine the matching results derived from the first keyword. This matching process continues until every keyword from the search string has been incorporated into the matching process. An end of the search string may be detected, for example, by a space or a pause in entry of any further keywords.

The results module 306 manages operations involving processing the search results prior to presenting the results to the user. In example embodiments, the results module 306 determines a level of a current or previous search and search results. Based on the level of the current or previous search or search result, different versions of content may be retrieved for presentation to the user. For example, if the level of the previous search results was at a category level (e.g., furniture), then a current search result building off of the previous search result (e.g., refining the previous search result or search string) may be at a sub-category level (e.g., sofas). In further embodiments, the level of the current or previous search is provided to the query input module 302 in order for the query input module 302 to determine one or more keywords to append to a previous search string as will be discussed in more detail below.

The user interface module 308 manages operations for causing presentation of the search results to the user (e.g., on a display of a client device of the user). In example embodiment, the user interface module 308 causes the search results to be present in a graphical format on one or more sides of a search bar or box. Accordingly, the user interface module 308 accesses images for the search results, and sends instructions and data to the client device of the user (e.g., client device 110) to present such a user interface. The user interface module 308 also manages appending previous search results to an end of a current search result set so as not to require the user to back track (e.g., select a "back" button or reload a page with the previous search results).

Figure 4A:
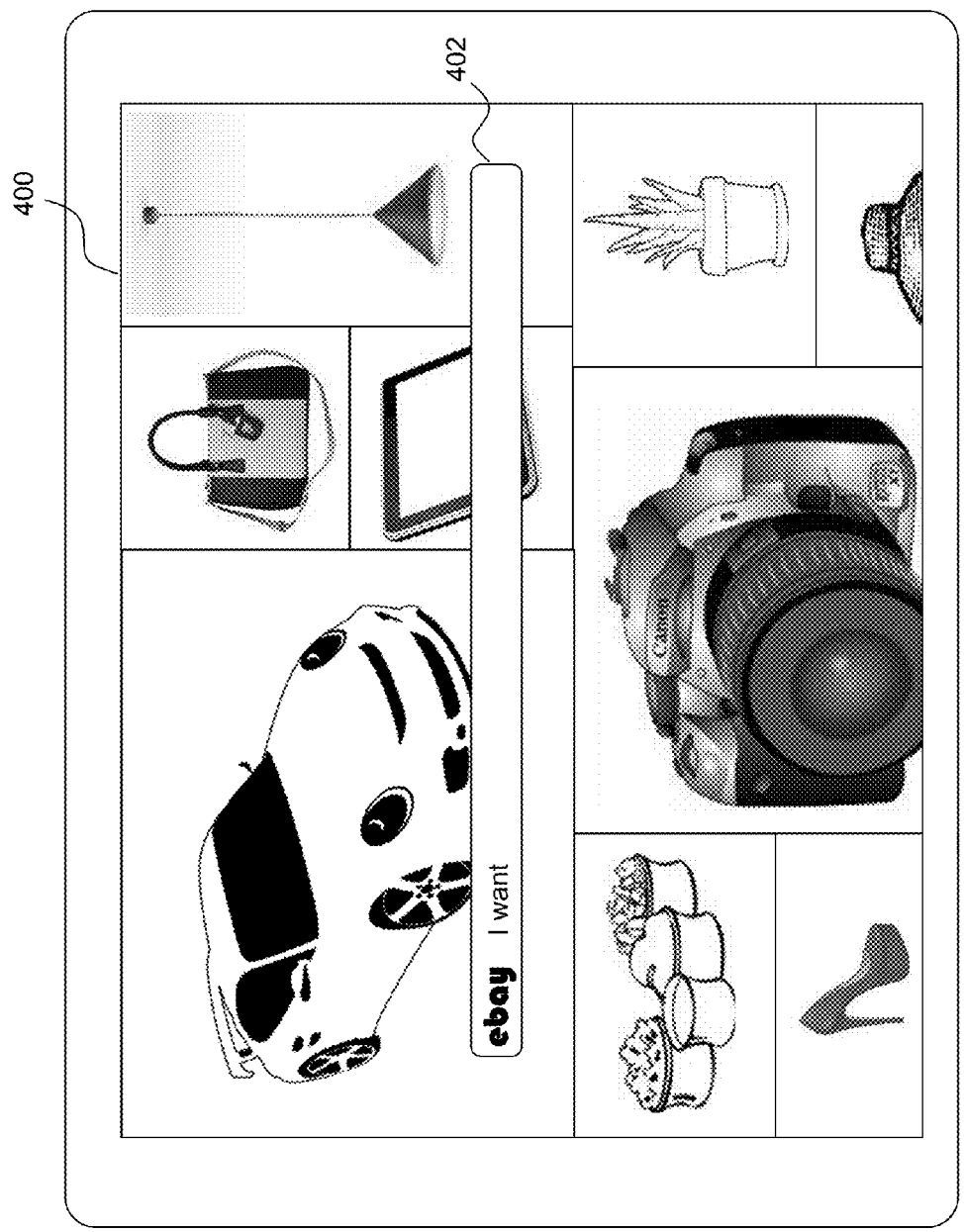
FIGS. 4A-4G are example user interfaces of the dynamic content delivery search system.

FIGS. 4A-4G are example user interfaces presented by the dynamic content delivery search system (e.g., via the user interface module 308). FIG. 4A show a user interface 400 comprising a home page where a user starts a search query. As illustrated, the user interface 400 includes a search bar 402 where the user can enter a search string.

The user interface 400 also provides a plurality of content shown as images from which the user may select to append to a present search string. The plurality of content may be personalized to the user in instances where the user is known to the publication system 120 (e.g., via a cookie, logged in with the publication system 120). For example, the content displayed on the home page may comprise categories of items that the user has previously purchased, has performed previously searches on, owns, has shown interest in, or any combination therein.

Figure 4B:
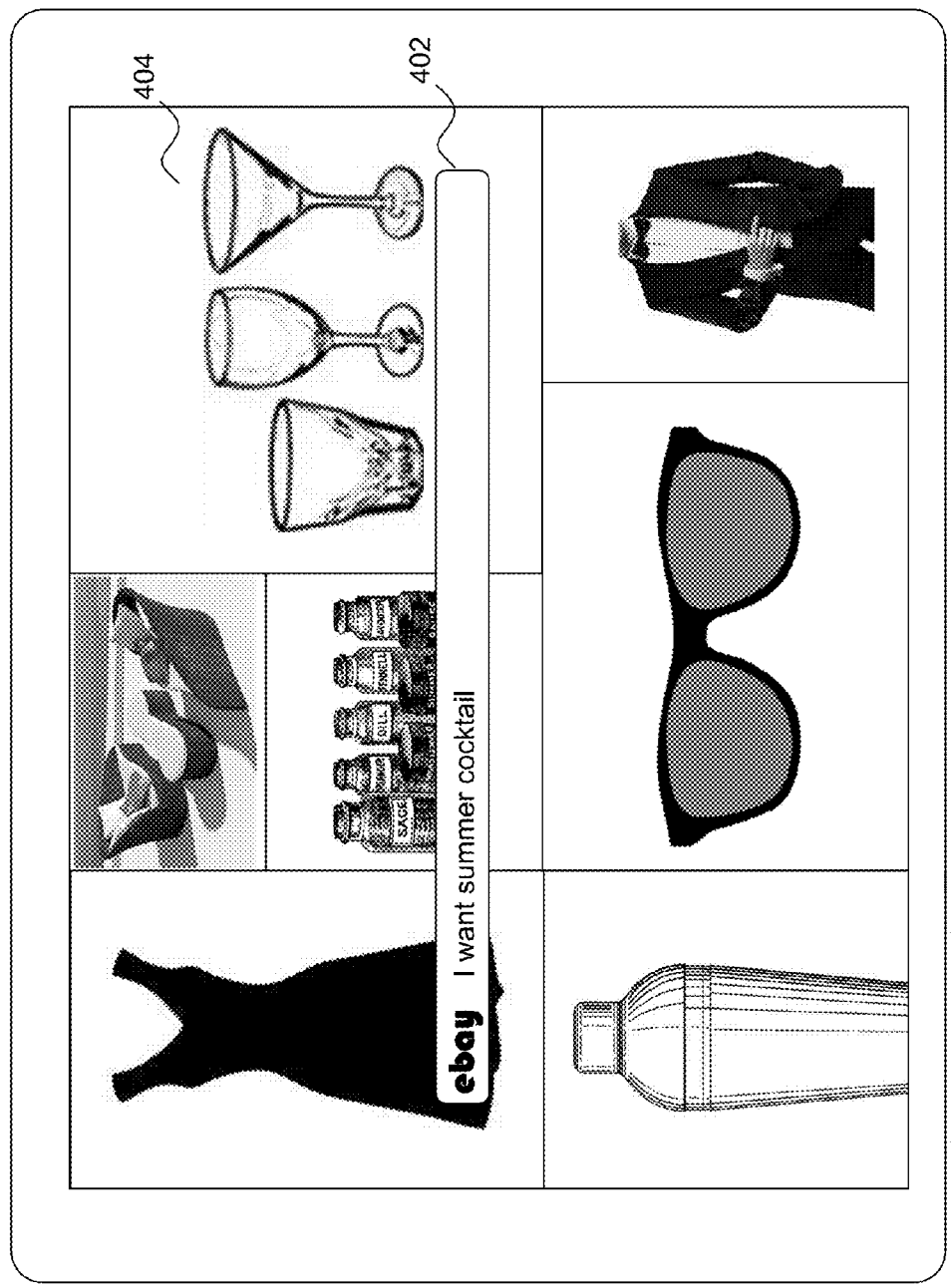

Referring now to FIG. 4B, the user has entered "summer cocktail" as the search string. In response, various images that correspond to categories that may be related to "summer cocktail" are "surfaced" or displayed around the search bar 402 as the user types "summer cocktail." In some embodiments, various results may be display as each keyword of the search string is entered. For example, after the user types "summer" a set of images may be displayed around the search bar 402. As the user continues entering the remainder of the search string (e.g., types "cocktail"), the images displayed around the search bar 402 are refined to display categories that correspond to "summer cocktail." In other embodiments, the images are not displayed until the user has completed the entry of the search string. However, the search engine 216 is dynamically curating and creating the search results based on what the user is entering in the search bar 402 as the user is entering the keywords, whereby search results are queued up in a backend (e.g., the publication system 120). As more keywords are appended in the search bar 402, the queued up search results are refined. As a result, the search results can be returned faster than in embodiments where the processing of a search string does not occur until after the user selects an "enter" key.

Figure 4C:
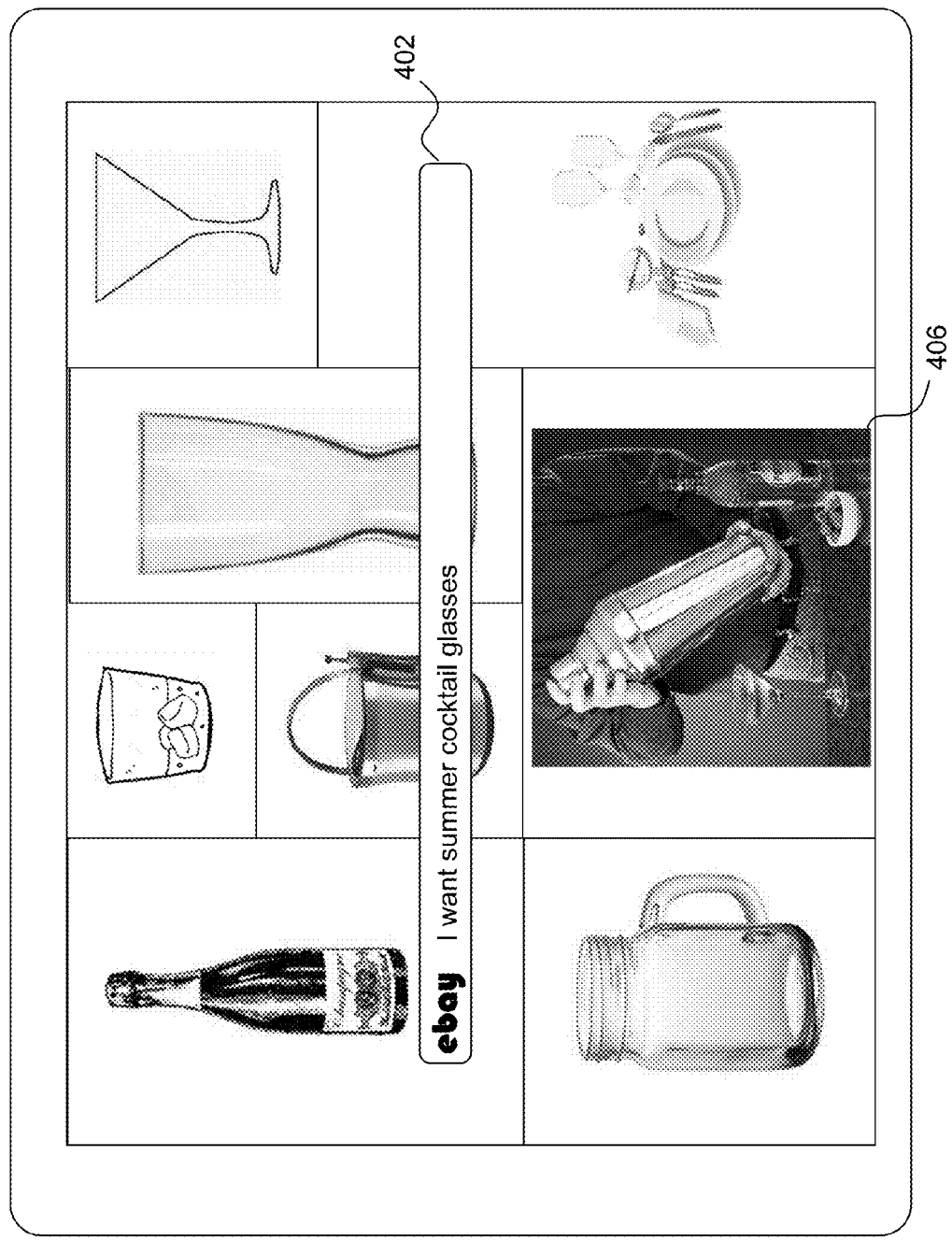

As shown in the example user interface of FIG. 4B, the various categories of the search results include, for example, eyeglasses, drinking glasses, women's clothing, men's clothing, barware, and furniture. The user can select an image corresponding to one of these categories to refine the search. For example, the user can select the image 404 corresponding to drinking glasses. By selecting this image, one or more keywords associated with the selected image are appended to the search string. For instance, the query input module 302 determines the one or more keywords from metadata (e.g., attributes describing an item in the image) associated with the selected image. The one or more keywords are appended to the search string by the user interface module 308 and used by the match module 304 to refine the present search results. Referring now to FIG. 4C, the search bar 402 now shows an addition of the keyword "glasses" resulting in a new search string "summer cocktail glasses." Accordingly, a selection of a visual representation or image can be used to refine the search.

The one or more keywords appended to the search string are dependent on a level of a current search. In one embodiment, each one of the displayed images is tagged (e.g., with an additional piece of metadata) to indicate a current level in the search. For example, returned results for "summer cocktail" represent categories (visual category representations). As such, the search engine 216 will detect that the image corresponding to "drinking glasses" has a tag of "category." Therefore, a selection of "drinking glasses" from the category level will indicate to the search engine 216 to append a keyword that corresponds to the category level and return results in a sub-category (e.g., products, stores) corresponding to drinking glasses. As a further example, if the current level were the sub-category of drinking glasses, then selection of an image displaying drinking glasses causes a keyword that corresponds to a sub-category level to be appended and return results at an item level (e.g., individual items available for purchase).

As shown in FIG. 4C, images corresponding to the search string "summer cocktail glasses" are now displayed around the search bar 402. The images may correspond to sub-categories related to summer cocktail glasses. For example, images corresponding to types of drinking glasses, accessories related to drinking glasses, and ingredients related to cocktails are displayed in FIG. 4C.

Figure 4D:
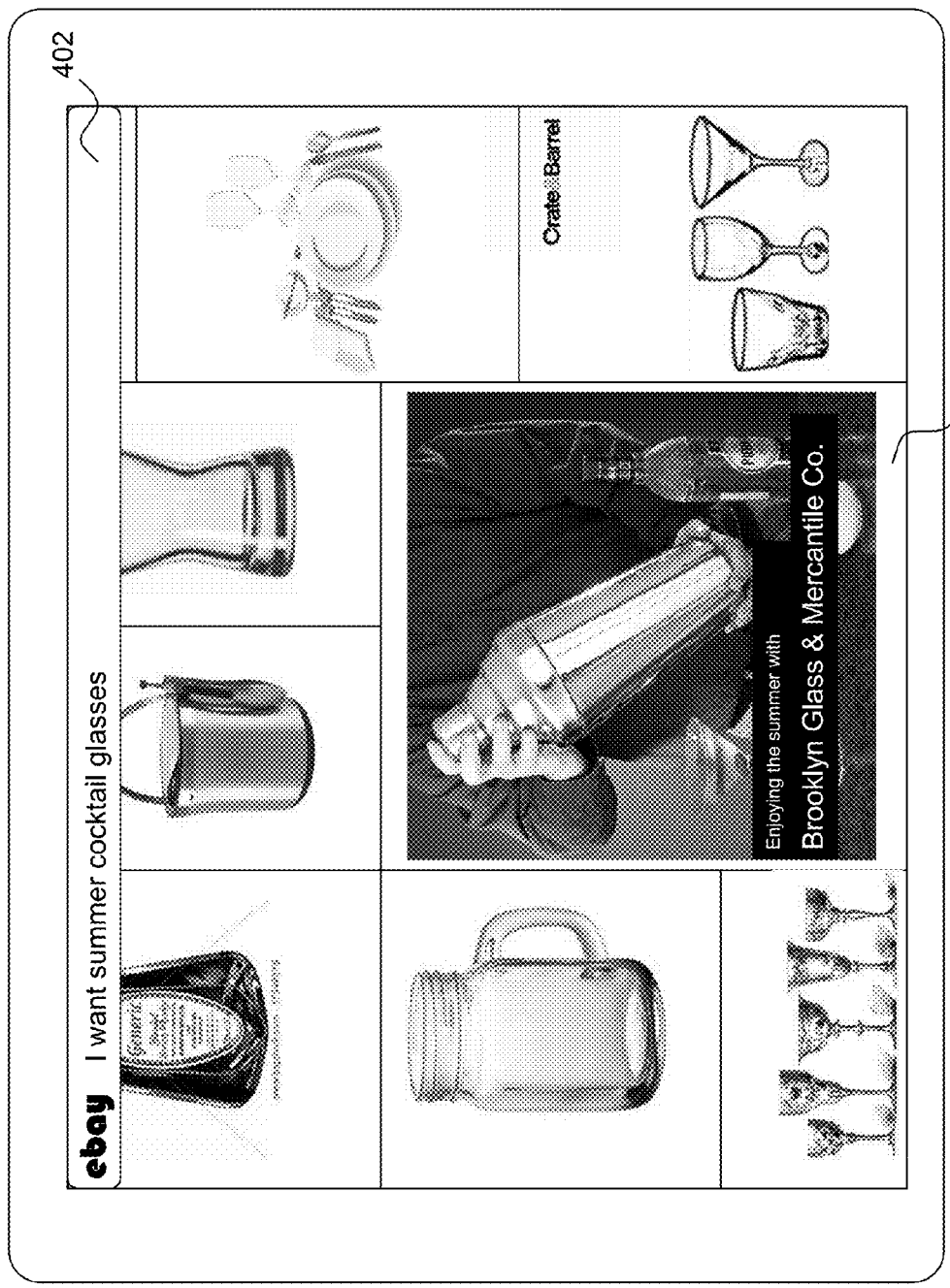

Additionally, an image 406 corresponding to a video 408 related to drinking glasses is displayed in FIG. 4C. If the user selects the image 406, the video 408 starts to play as illustrated in FIG. 4D. In the example user interface of FIG. 4D, the video 408 is associated with a store that sells drinking glasses (e.g., Brooklyn Glass & Mercantile Company) and may show, for example, how to make a cocktail. Further still, the search bar 402 may be repositioned (e.g., moved to a top of the user interface) in order to display the video 408.

Figure 4E:

A further selection of the image 406 (or the now playing video 408) results, for example, in a full screen 410 of the video 408 being displayed as shown in FIG. 4E. The search bar 402 remains in the repositioned location in order for the full screen 410 to be displayed (e.g., moved to a top of the user interface). Alternatively, the selection of the image 406 in FIG. 4C may cause the video 408 to play in the full screen 410 as shown in FIG. 4E.

Additionally, one or more keywords linked to the selected image 406 are appended in the search bar 402. In the present example, "from Brooklyn Glass & Mercantile Co." is appended to "summer cocktail glasses." The appending of the keywords associated with Brooklyn Glass & Mercantile Company causes the search engine 216 to further refine previous search results even though the user has not requested a further refinement (e.g., the user only indicated to play the video). As a result, the further refined search results may be queued up and ready for presentation prior to the user indicating a desire for more refined search results associated with the Brooklyn Glass & Mercantile Company.

Figure 4F:

Upon a further selection of the video 408 (or image corresponding to the video 408), the further refined search results are presented (e.g., items related to summer cocktail glasses from the Brooklyn Glass & Mercantile Company) as shown in FIG. 4F. In one embodiment, the items displayed in the further refined search are present in a scrollable user interface. In other embodiments, the items may be displayed in other formats (e.g., grid form, list form). The items displayed may include, for example, products for sale and recipes.

Figure 4G:
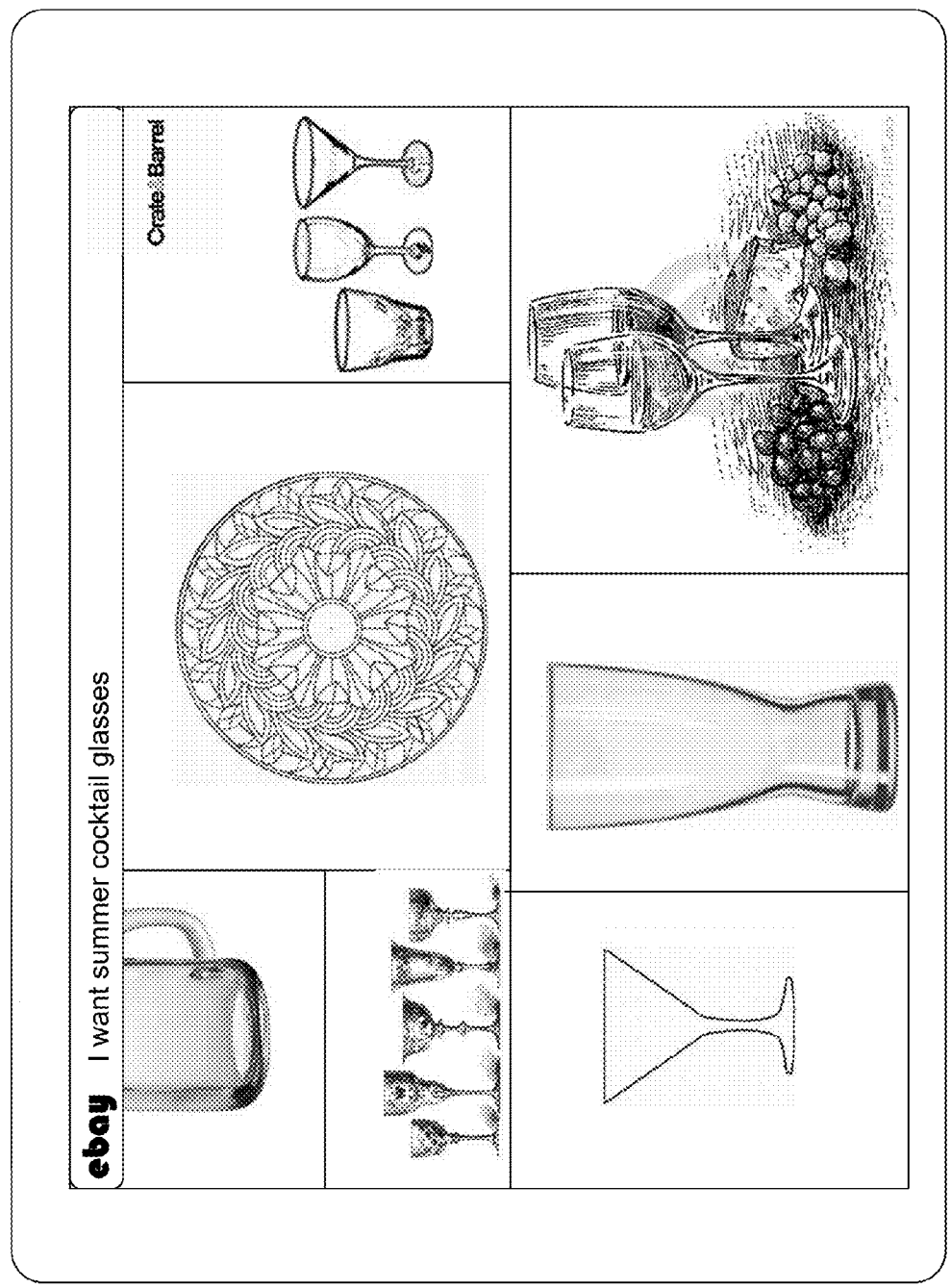

The user may scroll through the further refined search results. For example, if the display is on a touch screen device (e.g., a tablet), the user can swipe in an upward motion to scroll the further refined search results upward. At the end of the further refined search results, previous search results from a level above continue to be shown. As such, as the user continues to scroll up, the refined results from the Brooklyn Glass & Mercantile Company will push off of the user interface and the search results based on the search string "summer cocktail glasses" is presented as part of a continuously scrolling user interface as shown in FIG. 4G. Further still, the search bar 402 shows the current search string. As such, the search string has changed to indicate "summer cocktail glasses." If the user scrolls the search results in a downward motion from this point, the refined search results for "summer cocktail glasses from Brooklyn Glass & Mercantile Co" will be re-displayed and the search bar 402 changed accordingly. As a result, an endless search result page (SRP) is provided by the search engine 216. Accordingly, the search engine 216 knows where you came from (e.g., the previous level of the search results) and appends it to a bottom of a current level of the search results. This avoids the use of a back button along with having to reload a page containing the previous search results in response to a selection of the back button. The endless SRP process will be discussed in more detail below.

Figure 5:
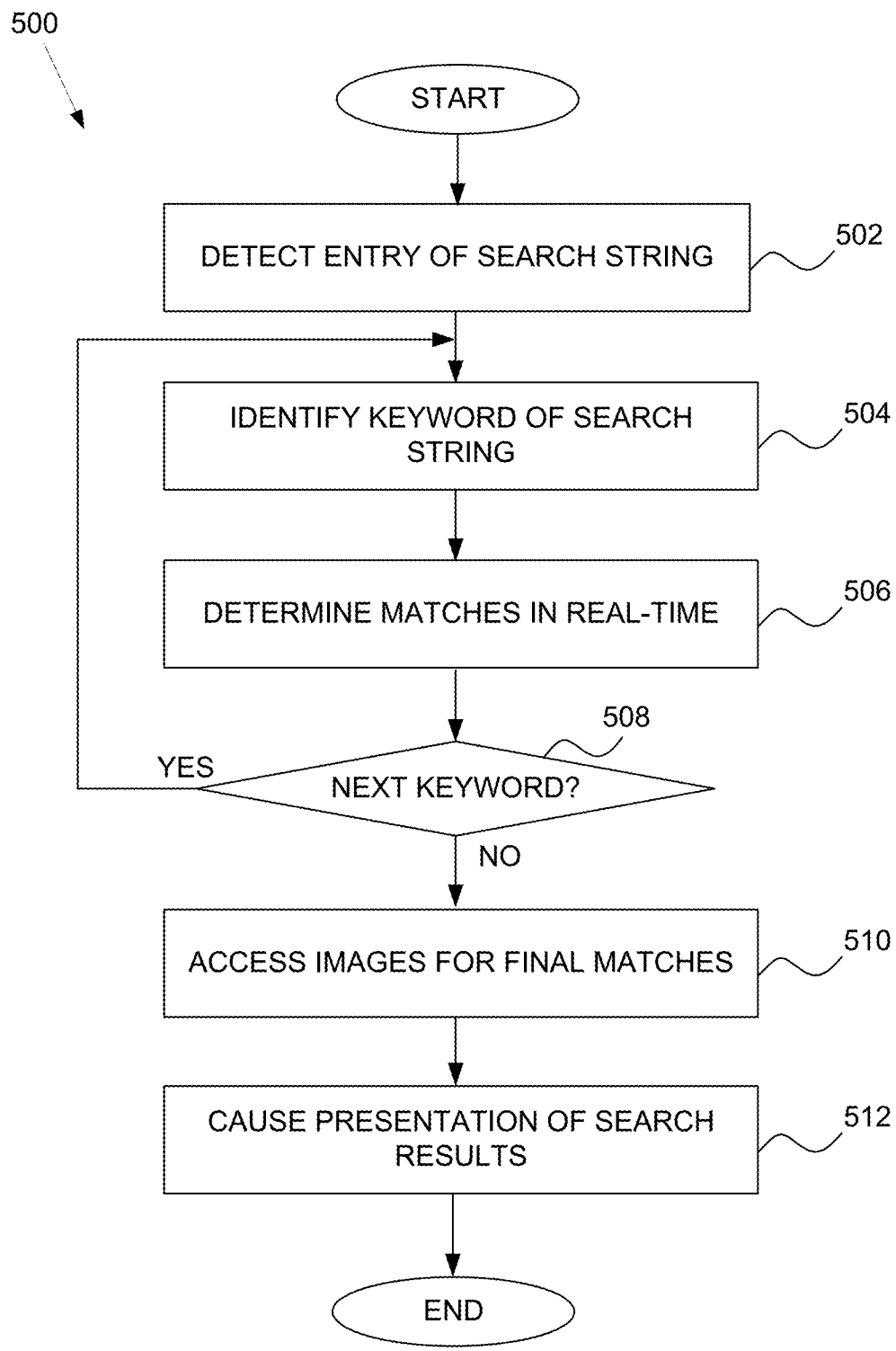
FIG. 5 is a flow diagram of an example method for providing dynamic content in a search system.

FIG. 5 is a flow diagram of an example method 500 for providing dynamic search content in a search system. In example embodiments, the search engine 216 dynamically performs matches as a search string is being entered in a search box or bar and queues up the search results for presentation. The user is not required to select an "enter" key in order to obtain results. As such, entry of a search string is detected in operation 502. The query input module 302 detects entry of a search string being entered in the search bar in substantially real-time (e.g., detecting keystrokes, characters, or numbers).

In operation 504, a keyword of the search string is identified. In example embodiments, the query input module 302 identifies each keyword as it is being entered in the search bar. For example, as soon as a user enters a first keyword in the search string, the query input module 302 detects and identifies the first keyword (e.g., "summer"). In one embodiment, the query input module 302 detects completion of entry of the first keyword based on a space after the keyword.

The keyword is then passed to the match module 304 where, in operation 506, matches to the keyword are determined in real-time. In example embodiments, the match module 304 receives the keyword detected by the query input module 302 and performs a matching process to derive results that match the keyword. As a result, matching results that match the keyword are determined and ready to be presented to the user (e.g., queued up for delivery).

In operation 508, a determination is made as to whether there is a next keyword in the search string. For example, the query input module 302 determines whether a next or subsequent keyword is entered for the search string. If a next keyword is detected, the method returns to operation 504 whereby the next keyword (e.g., "cocktail") is identified and used, in operation 506, to refine the previous matching results based on the first keyword.

This matching process continues until every keyword from the search string has been incorporated into the matching process. The addition of each keyword refines the previous matching results. As such, the matching process becomes significantly faster and requires less processing power with each iteration since the next keyword matches a smaller set of previous matching results.

Once no further keywords are detected (e.g., entry of the search string is completed), images of the final matches of the search results are accessed in operation 510. Accordingly, the user interface module 308 accesses the images from a database or repository storing publication information (e.g., database 124). The images may comprise images from third parties or stores, images from a catalog, images uploaded by various entities via the imaging engine 210, or any combination of these.

In operation 512, the search results are caused to be displayed on the client device (e.g., the client device 110) of the user. In example embodiments, the user interface module 308 sends instructions and data (e.g., image data) to the client device of the user to present a user interface whereby the images of the search results are displayed (e.g., above, below, or around the search bar). It is noted that while images providing a visual representation of the search results is discussed as being displayed as the search results, alternative embodiments may present other forms of search results. For example, the search results may be provides in a list format (with or without an associated image).

Figure 6:
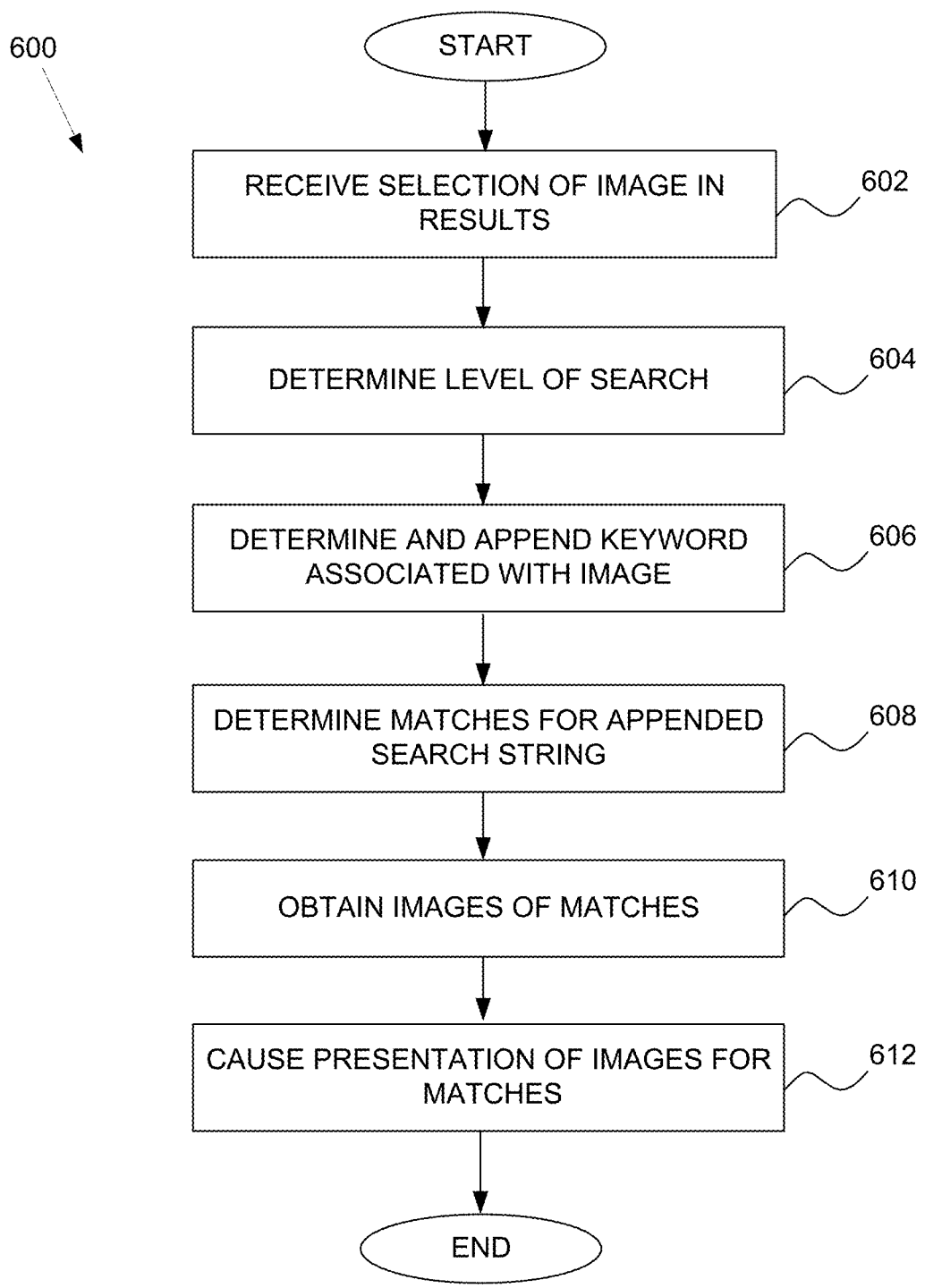
FIG. 6 is a flow diagram of an example method for refining dynamic content in the search system.

Referring now to FIG. 6, a flow diagram of an example method 600 for refining dynamic content is shown. In example embodiments, the search engine 216 can append further keywords to a search string based on a user selection of a current search result. This may be advantageous when the user, for example, does not know what a particular item is call, how to describe a particular item, or a name of a store or organization associated with a particular item. Instead, the user may refine a more generic search using images depicting items that are of interest to the user. In some embodiments, the method 600 may be performed based on the user having already entered a search string and having received search results based on the entered search string. The search results are displayed in the form of images presenting a visual representation of a particular search result. Alternatively, the method 600 may be performed based on the user being on a homepage displaying images of various categories (e.g., as shown in FIG. 4A).

In operation 602, a selection of one of the images is received. In example embodiments, the input query module 302 receives the selection of the image and accesses metadata associated with the selected image.

In operation 604, a level of the current search and the selected image is determined. For example, a determination may be made as to whether the selected image is a broad category image or if the selected image is a specific item image. The one or more keywords to be appended to the search string or the search results to be returned are dependent on a level of the current search. In one embodiment, the selected image is tagged to indicate a current level in the search (e.g., category level, sub-category level) when it is caused to be displayed to the user. In this embodiment, the level of the search is determined from the tag.

In operation 606, the one or more keywords are determined and appended to the search string. The one or more keywords may be determined from the metadata associated with the selected image based on the current level of the search. For example, if the current level of the search presents (category) results for "summer cocktail" and the user selects an image corresponding to Pottery Barn cocktail glasses, the keyword to be appended is "glasses." However, if the current level of the search presents (sub-category) results for "summer cocktail glasses" and the same image corresponding to Pottery Barn cocktail glasses is selected, then the keyword to be append may be "Pottery Barn" resulting in a search string "summer cocktail glasses from Pottery Barn." In yet a further example, if the current level of the search presents a storefront for Pottery Barn based on the search string "summer cocktail glasses from Pottery Barn," and the user select the same image, then the type of glass depicted in the image from Pottery Barn may be appended (e.g., "classic margarita"). In example embodiments, the user interface module 308 causes the one or more keywords to be added to the search string displayed in the search bar. The input query module 302 also provides the one or more keywords to the match module 304.

In operation 608, the match module 304 determines matches for the appended search string. Accordingly, the previous search results are refined by the appended keyword (s) to obtain a refined search result that is a search level lower than the previous search. The refining of the previous search results using the appended keyword(s) is performed without the user doing anything more than selecting the image (e.g., no "enter" key is required).

In operation 610, images of the final matches of the search results are accessed. Accordingly, the user interface module 308 accesses the images from a database or repository storing publication information (e.g., database 124). The images may comprise images from third parties or stores, images from a catalog, images uploaded by various entities via the imaging engine 210, or any combination of these.

In operation 612, the search results are caused to be displayed on the user device of the user. In example embodiments, the user interface module 308 sends instructions and data (e.g., image data) to the client device of the user to present a user interface whereby the images of the search results are displayed (e.g., above, below, or surrounding the search bar).

Figure 7:
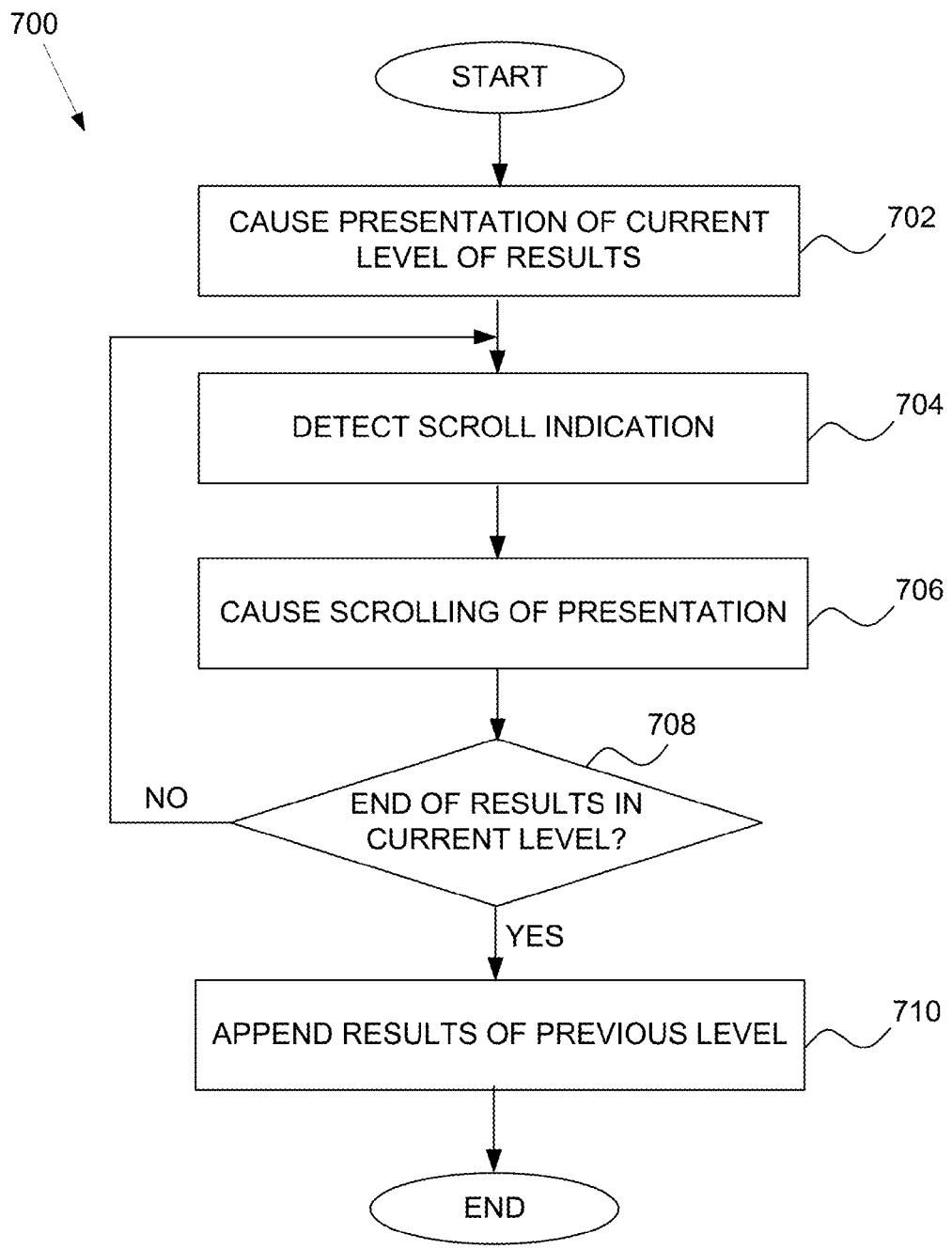
FIG. 7 is a flow diagram of an example method for providing endless search result pages (SRP).

FIG. 7 is a flow diagram of an example method 700 for providing endless search result pages (SRP). In example embodiments, the search engine 216 provides the endless search result page by appending a previous level of a search result to a bottom or end of a current level of a search result. This process avoids the use of a back button along with having to reload a page containing the previous search results in response to a selection of the back button. The operations of the method 700 are performed by the user interface module 308.

In operation 702, a current level of search results is caused to be presented on a user device (e.g., search results for "summer cocktail glasses from the Brooklyn Glass & Mercantile Co."). In example embodiment, the user interface module 308 causes the search results to be present in a graphical format by sending instructions and data to the client device of the user to present such a scrollable user interface. The search results may include text, images, or a combination of both for each result. The method 700 assumes that at least one initial search and a refinement of the initial search has been performed, and that the current level of the search result being caused to be presented is the search results based on the refinement.

In operation 704, a scroll indication is detected. For example, the user may swipe upward on a touchscreen displaying the current level of the search results. In response, the user interface module 308 causes the search results to scroll in the direction of the scroll indication in operation 706.

In operation 708, a determination is made as to whether an end of the search results in the current level (e.g., search results for "summer cocktail glasses from the Brooklyn Glass & Mercantile Co.") is reached. If the end of the search result in the current level is not reached, then the user interface continues to monitor for a scroll indication and causes presentation of scrolling search results in the direction of the scroll indication.

However, if the end of the search results in the current level is reached, then the user interface module 308 appends search results from a previous level (e.g., search results for "summer cocktail glasses") to a bottom or end of the search results in the current level. Accordingly, the search engine 216 understands the relationships between all of the items in the search results of the current level with respect to the overall total search result. If the search results of the current level (e.g., sports-sports categories-baseball) reaches an end, the user interface module 308 returns the search results to the previous level (e.g., sports-sport categories).

The appending of the previous search results does not need to serve a new page in order to present the previous search results. Instead, the previous search results are retrieved from cache and added to the end of the current search results, thus leveraging a cached experience and reducing processing requirements.

Figure 8:
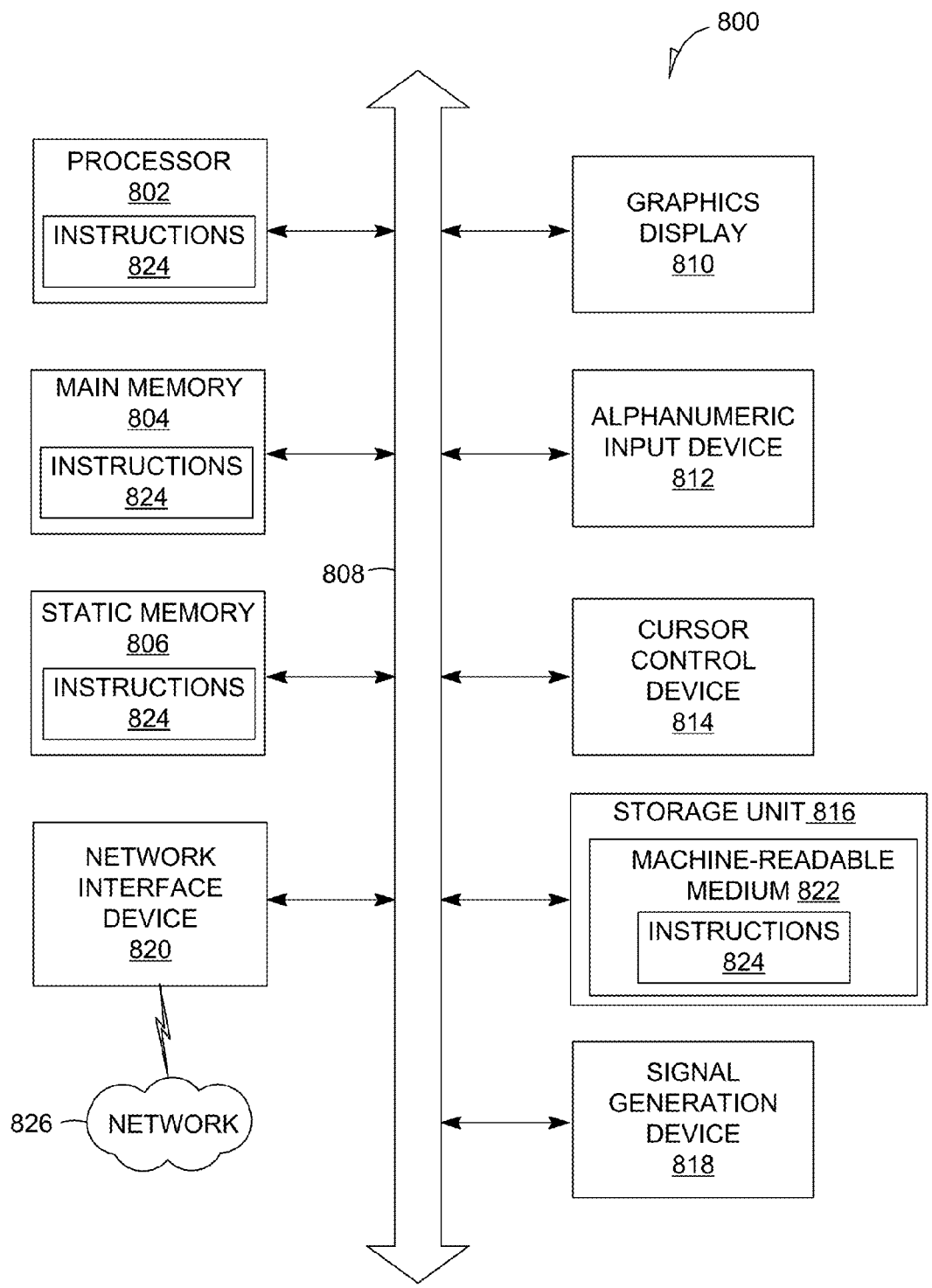
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media).

In some example embodiments, the machine 800 may be a portable computing device, such as a smart phone or tablet computer, and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, in a search bar, a first keyword of a search string;
in response to the receiving of the first keyword in the search bar, performing, using a hardware processor, a search for a first set of results matching the first keyword, the first set of results cached in memory;
in response to determining the first set of results, accessing images that correspond to the first set of results from a database;
causing presentation of the images that correspond to the first set of results;
upon performing the search for the first set of results, receiving, in the search bar, a second keyword of the search string;
in response to the receiving of the second keyword, using the second keyword by the hardware processor to refine the first set of results, the refining comprising removing results from the first set of matching results cached in memory that fail to match the second keyword to generate a second set of matching results, the second set of matching results being cached in memory, wherein the receiving of the first keyword, the receiving of the second keyword, the performing the search, and the refining of the first set of matching results occur without user selection of an enter key;

in response to the refining, updating the images being presented by presenting images that correspond to the second set of matching results; and in response to completion of entry of the search string in the search bar, causing presentation of search results that are cached in memory, the search results being a last set of results determined based on a last keyword of the search string.

2. The method of claim 1, wherein the causing presentation of the search results comprises causing presentation of a plurality of images, the method further comprising tagging each of the images with a tag indicating a current level of the search results.

3. The method of claim 1, wherein the causing presentation of the search results comprises causing presentation of a plurality of images, one of the plurality of images comprising a video, selection of the video causing the video to play.

4. The method of claim 1, further comprising:
receiving a third keyword of the search string; and
in response to the receiving of the third keyword, refining, using the third keyword, the second set of matching results to generate a third set of matching results, the refining comprising removing results from the second set of matching results that fail to match the third keyword.

5. The method of claim 4, wherein the receiving of the third keyword comprises receiving a selection of an image that corresponds to a result of the second set of matching results.

6. The method of claim 1, wherein the receiving of the second keyword comprises receiving a selection of an image that corresponds to a result of the first set of matching results.

7. A system comprising:
one or more hardware processors; and
a storage medium storing instructions that when executed by the one or more hardware processors, causes the one or more hardware processors to perform operations comprising:
receiving, in a search bar, a first keyword of a search string;
in response to the receiving of the first keyword in the search bar, performing a search for a first set of results matching the first keyword, the first set of results cached in memory;
in response to determining the first set of results, accessing images that correspond to the first set of results from a database;
causing presentation of the images that correspond to the first set of results;
receiving, in the search bar, a second keyword of the search string;
in response to the receiving of the second keyword, using the second keyword to refine the first set of results, the refining comprising removing results from the first set of matching results that fail to match the second keyword to generate a second set of matching results, the second set of matching results being cached in memory, wherein the receiving of the first keyword, the receiving of the second keyword, the performing the search, and the refining of the first set of matching results occurring without user selection of an enter key;

in response to the refining, updating the images being presented by presenting images that correspond to the second set of matching results; and in response to completion of entry of the search string in the search bar, causing presentation of search results that are cached in memory the search results being a last set of results determined based on a last keyword of the search string.

8. The system of claim 7, wherein the causing presentation of the search results comprises causing presentation of a plurality of images, the operations further comprising tagging each of the images with a tag indicating a current level of the search results.

9. The system of claim 7, wherein the causing presentation of the search results comprises causing presentation of a plurality of images, one of the plurality of images comprising a video, selection of the video causing the video to play.

10. The system of claim 7, wherein the operations further comprise:
receiving a third keyword of the search string; and
in response to the receiving of the third keyword, refining, using the third keyword, the second set of matching results to generate a third set of matching results, the refining comprising removing results from the second set of matching results that fail to match the third keyword.

11. The system of claim 10, wherein the receiving of the third keyword comprises receiving a selection of an image that corresponds to a result of the second set of matching results.

12. The system of claim 7, wherein the receiving of the second keyword comprises receiving a selection of an image that corresponds to a result of the first set of matching results.

13. A hardware storage device storing instructions which, when executed by the at least one processor of a machine, cause the machine to perform operations, the operations comprising:
receiving, in a search bar, a first keyword of a search string, the first set of results cached in memory;
in response to the receiving of the first keyword in the search bar, performing a search for a first set of results matching the first keyword;
in response to determining the first set of results, accessing images that correspond to the first set of results from a database;
causing presentation of the images that correspond to the first set of results;
receiving, in the search bar, a second keyword of the search string;
in response to the receiving of the second keyword in the search bar, using the second keyword to refine the first set of results cached in memory, the refining comprising removing results from the first set of matching results that fail to match the second keyword to generate a second set of matching results, the second set of matching results being cached in memory, wherein the receiving of the first keyword, the receiving of the second keyword, the performing the search, and the refining of the first set of matching results occurring without user selection of an enter key;

in response to the refining, updating the images being presented by presenting images that correspond to the second set of matching results; and in response to completion of entry of the search string in the search bar, causing presentation of search results that are cached in memory, the search results being a last set of results determined based on a last keyword of the search string.

14. The hardware storage device of claim 13, wherein the receiving of the second keyword comprises receiving a selection of an image that corresponds to a result of the first set of matching results.

* * * * *